Nov. 13, 1962

G. B. BRUECKER 3,063,581

SILO UNLOADERS

Filed June 16, 1959

INVENTOR.
George B. Bruecker,
BY Morsell & Morsell
ATTORNEYS.

Nov. 13, 1962 G. B. BRUECKER 3,063,581
SILO UNLOADERS
Filed June 16, 1959 2 Sheets-Sheet 2

INVENTOR.
George B. Bruecker,
BY
Morsell & Morsell
ATTORNEYS.

United States Patent Office 3,063,581
Patented Nov. 13, 1962

3,063,581
SILO UNLOADERS
George B. Bruecker, 1412 Oak Ridge, Kaukauna, Wis.
Filed June 16, 1959, Ser. No. 820,656
8 Claims. (Cl. 214—17)

This invention relates to improvements in silo unloaders, and more particularly to a mechanical silo unloader having improved means for collecting and discharging silage.

Heretofore, numerous mechanical devices have been designed in an effort to eliminate the tedious and time-consuming chore of manually removing fodder or other feed from silos for the purpose of feeding livestock. The most practical and successful of these devices have been those employing a power-driven, rotary collector which delivers the silage to a laterally-disposed conveyor. In this type of automatic unloader, the rotary collector is rested on top of the silage and, as it rotates, continuously delivers the upper surface of the feed radially inwardly toward the center of the silo. When the silage reaches the center it is lifted, by means of a mechanical elevator, to the lateral conveyor which carries the same to the silo door and discharges it into a chute. As the level of the silage is reduced the unloading mechanism is also lowered, following on the surface of the silage. In some unloaders of this type, the silage is lifted from the rotary collector by suction, rather than a mechanical elevator, and is blown through the doorway into the discharge chute.

While such automatic unloaders have greatly reduced the time and labor required for unloading silage, and have met with considerable commercial success, the machines have not been entirely satisfactory. Primarily, it has been found that the mechanical elevators employed to lift the silage onto the lateral conveyor frequently become clogged or break down, and are extremely troublesome and expensive to maintain. Moreover, such elevators require considerable power and add substantially to the cost of operating the machine. The suction or blower devices used in some machines in an effort to eliminate elevators are even more expensive, and are also subject to frequent mechanical difficulties.

With the above in mind, therefore, the principal object of the present invention is to provide a silo unloader of the general type described, but wherein neither a mechanical elevator nor a blower is required to transfer the feed from the rotary collector onto the lateral conveyor.

A more specific object of the present invention is to provide an automatic silo unloader wherein the lateral conveyor is positioned beneath the rotary collector, rather than above the same, the silage gathered by the rotary collector dropping downwardly onto the conveyor mounted thereunder.

A further object is to provide an improved silo unloader as described wherein by eliminating the need for lifting the silage upwardly onto the lateral conveyor, the power requirements and operating cost of the machine are reduced and the possibility of mechanical failures minimized.

A further specific object is to provide a silo unloader as described wherein the lateral conveyor, mounted beneath the rotary collector, cuts a continuous trough in the silage as the unloader moves downwardly in the silo, thereby permitting the uniform descent of the machine as the level of the silage is reduced.

A further object is to provide an automatic silo unloader wherein the machine is always supported in a level horizontal plane within the silo, thereby insuring its efficient operation and avoiding frequent interruptions for adjustment or repositioning.

Another object is to provide a silo unloader as described wherein improved, coacting drive members are employed to drive the collecting and conveying mechanisms, said drive members being designed to operate with maximum efficiency and with a minimum of attention and servicing.

It is a further object of this invention to provide a new and useful silo unloader which is especially designed for use in a silo having flexible, bow-shaped doors, as well as silos having conventional, flat, rigid door members.

A still further object of the invention is to provide a silo unloading device as described, which device can be quickly and easily converted to assist in loading crops into a silo, there being an attachment designed to distribute feed evenly to all parts of the silo, thereby insuring the uniform packing of the silage and increasing the storage capacity of the silo.

With the above and other objects in view, the invention consists of the improved silo unloader and all of its parts and combinations, as set forth in the claims, and all equivalents thereof.

In the accompanying drawings, illustrating one complete embodiment of the preferred form of the invention and a modification thereof, and wherein like reference characters indicate the same parts in all of the views.

Figure 1:
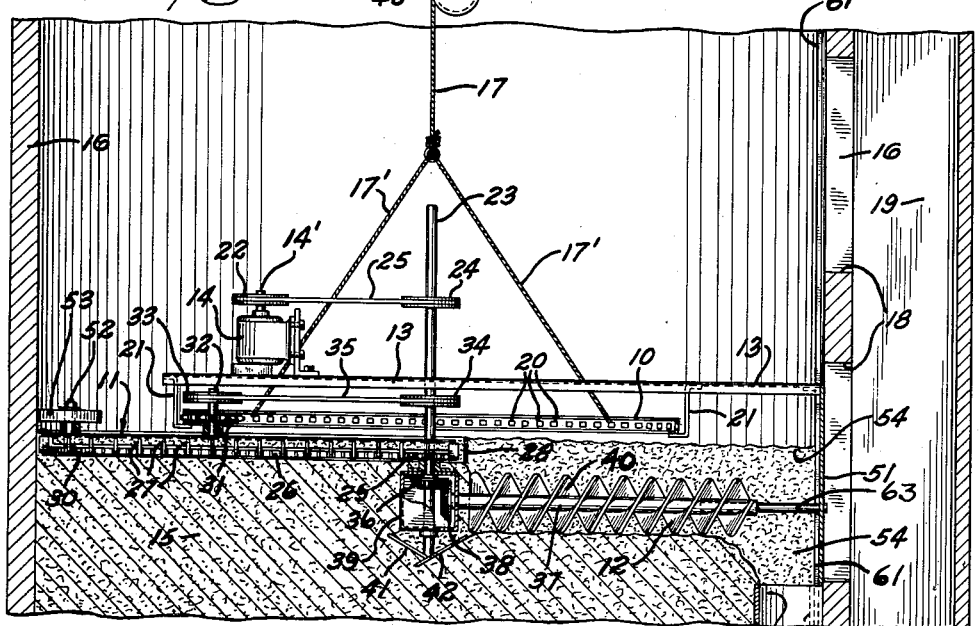
FIG. 1 is a fragmentary vertical sectional view of a silo showing, in side elevation, the improved unloader in operative position therein.
Figure 3:
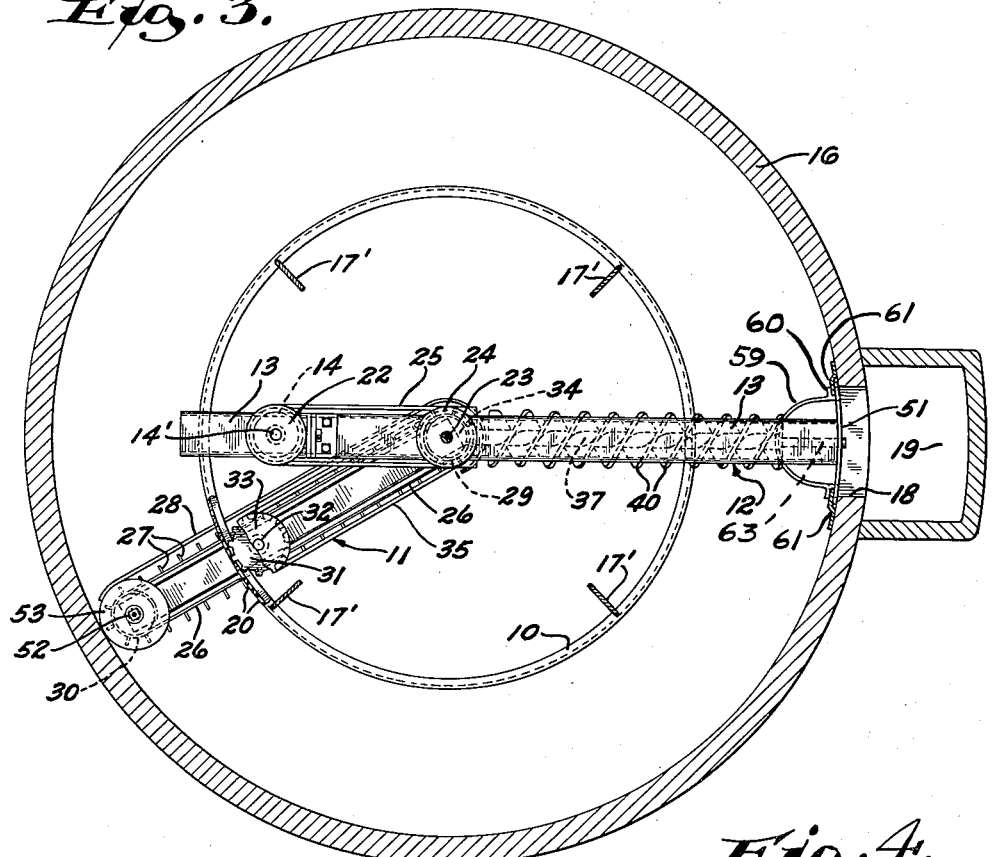
FIG. 3 is a horizontal sectional view through the silo illustrated in FIG. 1.

Referring now more particularly to FIGS. 1 and 3 of the drawings, it will be seen that the automatic silo unloader comprising the present invention includes a rotatable, axial shaft 23, a suspension ring 10 encircling said shaft, a rotary collector 11 mounted below the suspension ring and projecting radially outwardly from said shaft, and a lateral conveyor 12 mounted below said rotary collector. Supported on and spaced above the suspension ring, is a stationary platform 13 upon which the motor or other power unit 14 is mounted.

Figure 2:
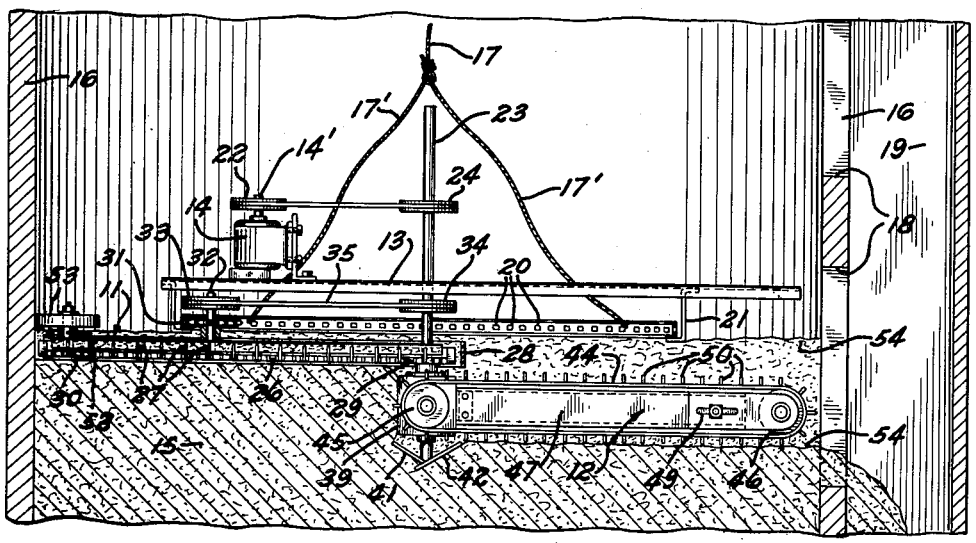
FIG. 2 is a view similar to that shown in FIG. 1, illustrating a modified form of the invention.

The assemblage is supported by a cable 17 having a plurality of stays 17' attached thereto and secured to the ring 10. Said cable is extended over a pulley 48 attached to the silo roof and secured to a power winch or other suitable winding means so that the unloader may be easily raised or lowered in the silo as desired. Although the ring 10 is usually suspended several inches above the surface of the feed, to insure that the unloader is always in a level plane, it is also possible to rest the ring directly on the silage, as illustrated in FIG. 2, with the entire weight of the machine being borne thereby. The latter arrangement permits the unloader to automatically descend with the level of the feed and is preferred in instances where the silage is loosely packed and is not stuck or frozen to the silo wall. Normally, however, the condition of the silage is such that the cable suspension means illustrated in FIG. 1 produces better results and the latter arrangement is more common.

The silo 16 illustrated herein is of the conventional cylindrical type and includes a plurality of vertically spaced, rectangular openings or doorways 18 which extend the entire height of the silo. Said openings are provided with removable doors which are taken out one at a time as the level of the silage is reduced. A chute 19 is permanently attached to the exterior of the silo, in covering relation to the doorways 18, and in silos having conventional doors, said chute provides a passageway for the feed discharged by the unloader (FIG. 2).

As hereinbefore mentioned, some silos now utilize a flexible, bow-shaped door, in place of the usual flat, rigid panels, and it is in conjunction with such silos that the machine illustrated in FIGS. 1 and 3 is designed, although it is to be understood that the machine can be easily adapted for use in silos having the conventional type of door, as illustrated in FIG. 2. The newer, bow-shaped doors 59 are formed of flexible metal or the like and have side edge flanges 60 (FIG. 3) which are adapted to be removably engaged and retained by vertical tracks 61 adjacent each side of the doorway and extending the height of the silo. To remove a door it is merely necessary to flex the same, urging the side edges toward each other and free of the tracks 61, and to withdraw the door through the opening. When the doors are in their assembled condition they form a continuous, vertical chute 62 in the interior of the silo and it is this chute, rather than the permanent exterior chute 19, which is used as a passageway for the silage collected by the unloader. The construction of the silo doors is not, of course, a part of the present invention but has been described herein in some detail to permit a better understanding of the following description of the form of the unloader illustrated in FIGS. 1 and 3.

The suspension ring 10 forming a part of the unloading machine is channel-shaped in cross section and has a diameter substantially less than the diameter of the silo. Said ring is normally suspended several inches above the surface of the silage, as described, by means of the cable stays 17' connected thereto. The outer edge face of said ring is provided with a plurality of closely spaced apertures 20 extending about its entire circumference, said ring forming a gear track, the purpose of which will be hereinafter seen.

The stationary platform 13 supporting the motor is mounted on top of the suspension ring and is rigidly secured thereto by brackets 21. Said platform is relatively narrow and has an extendable end portion projecting beyond the ring and terminating adjacent the doorway 18 in the silo wall. The power unit 14 is bolted to said platform at the end opposite said doorway, the illustrated power unit being an electric motor suitably connected to a source of power, although a gasoline engine or other prime mover may also be utilized. The motor is provided with an upwardly-projecting drive shaft 14' having a sheave or drive pulley 22 mounted thereon, and the axial shaft 23, which is rotatably projected through said platform 13 has a similar sheave 24. A belt 25 is engaged about said sheaves 22 and 24 and provides means for communicating the rotatable movement of the drive shaft to said axial shaft.

The rotary collecting device 11 is mounted below the suspension ring 10, being partially embedded in the silage, and comprises an arm-like assemblage adapted to revolve about the axis provided by said vertical central shaft 23. Said arm assemblage includes a laterally-disposed endless chain 26 having a plurality of spaced, horizontal fingers 27 projecting therefrom, said chain being partially enclosed by a housing 28 which covers the top and back longitudinal edge thereof, the bottom and leading longitudinal edge being open to permit the fingers 27 to engage and gather feed as the arm revolves. A stub shaft 52 projects upwardly from the top of the housing, adjacent its outer end, there being a guide wheel 53 mounted on said shaft and positioned above the surface of the feed. Said guide wheel abuts the inner face of the silo wall and is designed to ride upon said cylindrical wall as the collector arm rotates circumferentially around the silo. The rotation of the central shaft 23, through its connection to the motor drive shaft as described, causes the chain 26 to travel simultaneously, the fingers thereon drawing the top surface of the silage radially inwardly toward the center of the silo.

Figure 4:
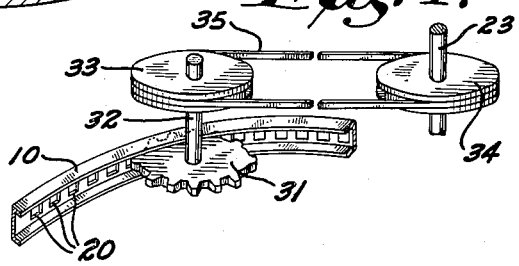
FIG. 4 is a fragmentary perspective view of the suspension ring, showing the sheave and gear mechanism employed to drive the rotary collector.

As the chain 26 rotates, the entire collecting arm also revolves about the axial shaft 23, the driving mechanism therefore being shown in FIG. 4. A rotatable shaft 32 is projected upwardly from the top of the housing 28 and has a toothed gear wheel 31 mounted thereon and positioned against the inner side of the channel-shaped suspension ring 10, the gear teeth being designed to mesh with the apertures 20 in said ring. A sheave 33 is rigidly mounted on the upper portion of said shaft 32, between the suspension ring and the platform 13 spaced thereabove, and a similar sheave or drive pulley 34 is mounted on the axial shaft 23. A belt 35 is extended between and drivably connects said sheaves, thereby providing means for communicating the rotatable movement of the shaft 23 to the shaft 32 and attached gear 31, and providing means for revolving the arm assemblage circumferentially around the silo.

The lateral conveyor 12 hereinabove referred to may be in the form of a screw-type or auger conveyor, as illustrated in FIGS. 1 and 3, or it may comprise a revolving belt having vertically-projecting arms 50, as shown in FIG. 2. Either type of conveyor may be utilized and the particular form employed is not critical to the present invention. Rather, it is the novel positioning and mounting of the conveyor, beneath the plane of the collecting arm 11, and the improved drive mechanism therefor which is essential.

In the form of the invention illustrated in FIGS. 1 and 3, utilizing a screw-type conveyor, the lower portion of the rotatable axial shaft 23 is provided with a beveled gear 36 designed to intermesh with and drive a similar gear 38 formed on the inner end of an elongated horizontal shaft 37, the latter shaft projecting radially outwardly in a fixed position. Said shaft 37 has a helical blade 40 thereon adapted to urge the silage radially-outwardly and into the chute 62 formed by bow-shaped doors 59 therebelow, as will be hereinafter described.

The gears 36 and 38 are encased in a housing or gear box 39, and, as will be seen in FIG. 1, the lower end of the axial shaft 23 is extended downwardly through the housing bottom wall. Removably rigidly secured to the end of said rotatable shaft 23, and positioned beneath the gear housing, are a pair of thin, angularly-disposed, blade-like arms 41 and 42 designed to spin with said shaft when the machine is in operation. As will be readily appreciated said spinning blades function to loosen and cut a path in the silage, beneath the gear box, which permits the unimpaired descent of said box as the unloader travels downwardly with the surface of the silage. In addition, said spinning blades provide a protective shield which prevents silage from finding its way into the gear box and clogging or damaging the driving mechanism.

The outer end of the auger shaft 37 terminates short of the silo wall and has a smaller shaft 63 longitudinally slidably mounted therein and projecting outwardly therebeyond. The radially-outward projecting end of said smaller shaft 63 is secured to and supported by a plate 51 depending from the end of the rigid platform 13, thereby providing indispensible support means for the auger shaft. The slidable nature of the auger shaft on the shaft 63 allows said auger shaft to shift thereon relative to the silo wall to compensate for any unevenness or out-of-round in the silo. This self-adjustment feature permits the use of the present unloader in a great number of silos which are imperfectly formed, and constitutes an important advantage of the present invention.

As will be seen in FIG. 3, the plate 51 may be fitted within the door tracks 61, in silos utilizing the newer type doors, whereby said plate is held firmly against and substantially flush with the silo wall, where it will not interfere with the passage of the guide wheel 53 as the rotary collector travels around the silo. In addition, said tracks prevent the dislocation of the plate and attached auger as the machine is lowered, thereby promoting the smooth and even descent of the unloader with the surface of the silage. In the event the plate is mounted within the door tracks 61 as described, it is necessary, of course, to remove the door immediately therebelow as the plate moves downwardly in the tracks. Besides providing support means for the outer end of the auger shaft, the plate 51 also covers the doorway opening 18 so that silage delivered by the lateral conveyor is at all times directed into the chute 62 formed by the bow-shaped door members 59 therebelow, rather than the exterior chute 19. Moreover, the presence of said plate eliminates the possibility of the guide wheel 53 jumping into and becoming stuck in the opening each time the revoluble collecting arm passes the doorway.

The modified form of the unloader shown in FIG. 2 employs an endless belt, in place of the screw-type or auger conveyor characterizing the principal form of the invention, the basic elements of the machines being otherwise similar. The invention is illustrated in FIG. 2 in association with a silo designed to accommodate conventional, flat door or panel members (not shown), but it is to be understood that the machine, like the unloader illustrated in FIGS. 1 and 3 can be easily adapted for use in silos employing either type of door. In the machine shown in FIG. 2, the conveying belt 44 is extended about a sheave 45 suitably drivably connected to the rotatable central shaft 23, the opposite end of said belt being trained about a sheave 46 adjacent the silo wall opening. An elongated, horizontal supporting arm 47 is rigidly secured to the gear box and projects radially outwardly therefrom to provide support means for said outer sheave, said arm being formed in two interfitting sections and having a slot and bolt connection 49 permitting the adjustment of its length to compensate for any variations in the diameter or contour of the silo. Said belt 44 is provided with a plurality of spaced, vertically-projecting arms 50 which are designed to engage the silage deposited on said belt to promote its passage to and into the discharge chute 19.

In both the form of the invention employing a screw-type conveyor and the form wherein the endless belt type of lateral conveyor is utilized, the rotary motion of the conveyor constantly digs a trough 54 (FIGS. 1 and 2) in the silage as the unloader descends with the level of the feed. This trough performs a two-fold purpose, first, it leaves the top of the conveyor exposed so that feed collected by the rotary arm 11 will fall onto the conveyor, as will be described and, secondly, the trough-digging action facilitates the uniform downward movement of the elongated conveyor and maintains the unloader in a level horizontal position.

In the operation of the improved silo unloader comprising the present invention, the machine is first lowered into a silo, through the winch and cable device hereinbefore described, until the suspension ring 10 is either rested on or spaced slightly above the top of the silage, depending upon the condition of the silage. In the event the ring is rested directly on the silage, both the rotary collector and lateral conveyor members are embedded below the surface. The machine is positioned so that the outer end of the lateral conveyor 12 is in alinement with the doorways 18 in the silo wall and the door adjacent the conveyor is removed. The motor 14 may then be switched on to commence the unloading operation.

As the motor drive shaft 14' turns, the axial shaft 23 is also rotated, through the power communicating means described, said axial shaft driving the collector arm assemblage 11 about its central axis and, at the same time, rotating the chain 26 forming an integral part of the collector arm. The lateral conveyor 12, mounted below the plane of said rotary collector, is also driven through the rotating central shaft 23, the necessary gearing being encased in a gear box 39 mounted on the lower projecting portion of said shaft.

As the collector arm travels circumferentially around the silo, the chain 26 and attached fingers 27 constantly move the feed collected by said revolving arm radially inwardly and continuously deposit the same onto the lateral conveyor. The conveyor carries the silage outwardly and deposits the same into either the discharge chute 62, formed by the doors 59, or the external chute 19, depending upon the type of doors used. The result is a system of coacting and complementary collecting and conveying devices which insures the fast and efficient unloading of the silage.

As the level of the silage is reduced, the unloader is lowered simultaneously. When the condition of the silage permits the resting of the suspension ring 10 directly on the surface of the silage, the machine descends automatically. In other instances, the machine can be lowered independently very easily by means of the cable and winch mechanism described. It is also necessary, of course, that the silo doors be removed, one at a time, as the level of the silage is reduced. In silos having the older, flat doors, the doorway adjacent the lateral conveyor must be open to provide access to the exterior chute 19, and in silos utilizing the newer, bow-shaped doors, wherein an interior chute 62 is provided, the successive removal of the doors is necessary to permit the downward travel of the machine. When the contents of the silo have been completely removed, the doors are, of course, replaced so that the silo is in condition to receive and store a new supply of crops.

As hereinbefore mentioned, in addition to its primary use as a device for automatically removing fodder or other crops from a silo for the purpose of feeding livestock, the present invention may also be used when loading feed into a silo, to promote the even and uniform distribution and packing of the feed and to insure that the full capacity of the silo is utilized. When used in this manner, the machine is designed to supplement, and to function in cooperation with, a blower tube or similar conventional filling device adapted to discharge feed into a silo but not to distribute it thereabout. To convert the machine for use as a loader, the entire assemblage is first raised to a point near the silo roof, where it is in a position to receive feed from the blower tube, and the blades 41 and 42 are removed from the lower end of the axial shaft 23 and replaced with a special, rotatable deflecting device.

Figure 5:
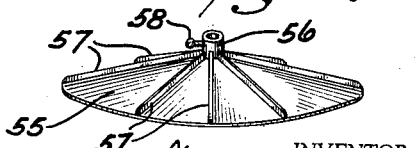
FIG. 5 is a perspective view of the attachment used for loading feed into a silo.

The deflector attachment is illustrated in FIG. 5 and comprises a cone 55 having a sleeve 56 projecting upwardly from its pointed top and a plurality of raised ribs 57 extending downwardly and radially outwardly from the vertex. After the blades 41 and 42 have been removed, the sleeve 56 may be fitted onto the end of the shaft 23 and rigidly secured thereto by means of a set screw 58 or the like, so that the cone will spin with said shaft when the motor is actuated. In the principal form of the invention illustrated in FIG. 1, the mechanisms ordinarily driving the rotary collector and auger-type lateral conveyor are disengaged inasmuch as those members are not employed in the loading operation.

In filling a silo, the blower tube is positioned to discharge a stream of fodder or other feed onto the rapidly-spinning cone 55, the feed being directed radially outwardly by the ribs 57 and thrown from the periphery of said cone. As will be appreciated, feed thrown from the spinning cone is distributed evenly and uniformly throughout the silo, thereby eliminating waste areas and insuring that the storage capacity of the silo is fully realized.

In the modified form of the machine shown in FIG. 2, the drive means for the lateral conveyor 12 may be reversed, rather than completely disengaged as in the auger-type conveyor, and the blower tube positioned to direct and feed onto the outer end of the conveyor belt 44. The belt carries the feed radially-inwardly toward the center of the silo and discharges the same directly onto the spinning cone, which distributes the feed about the silo in the manner described. In this form of the invention, a shorter, less expensive blower tube may be employed, and, in addition, the possibility of some of the feed missing the cone and accumulating unevenly in the silo, is avoided.

From the foregoing detailed description, it should be clear that the present invention provides an improved, automatic device for loading and unloading silage which is both novel and practical. In the present machine, there is no necessity for a power-driven elevating device such as is required with conventional unloading machines. Consequently, the power requirements and operating costs of the machine are less than those of conventional unloaders, the cost of manufacture and assembly is reduced, and the incidence of mechanical failures is substantially lessened.

It is to be understood, of course, that the improved silo unloader comprising the present invention is not to be limited or confined to the exact structural details of the individual components shown and described herein. Obvious modifications in the individual members will suggest themselves to persons skilled in the art, and all of such changes or modifications are contemplated which do not depart from the spirit of the invention and which may come within the scope of the following claims.

What I claim is:

1. A silo unloader comprising: a frame member movably mounted adjacent the top surface of the silage; a rotatable vertical shaft depending from said frame member, said shaft being centered in the silo; a prime mover drivably connected to said rotatable vertical shaft; a radially disposed collecting arm mounted below said frame member and connected at its inner end to said vertical shaft; means operatively associated with said rotatable vertical shaft for revolving said collecting arm thereabout; a lateral conveyor mounted beneath said collecting arm, the inner end of said lateral conveyor being drivably connected to said vertical shaft and said lateral conveyor projecting radially outwardly therefrom; and means depending from said frame member closely adjacent the silo wall connected to and supporting said lateral conveyor.

2. A silo unloader comprising: a frame member movable mounted adjacent the top surface of the silage; a vertical shaft rotatably supported by said frame member, said shaft being centered in the silo; a prime mover drivably connected to said rotatable vertical shaft; a radially disposed collecting device mounted below said frame and connected at its inner end to said vertical shaft, said collecting device comprising an inner sheave mounted on and for rotation with said vertical shaft, a housing extending radially outwardly from said vertical shaft, a sheave rotatably mounted in the outer end of said housing adjacent the silo wall, and an endless member trained about said sheaves, said endless member having means thereon for engaging the upper surface of the silage and moving the same radially inwardly; means operatively associated with said rotatable vertical shaft for revolving said collecting device thereabout; and a lateral conveyor mounted beneath said collecting device, said lateral conveyor being drivably connected at its inner end to said vertical shaft and projecting radially outwardly therefrom.

3. A silo unloader comprising: a frame member movably mounted adjacent the top surface of the silage; a vertical shaft rotatably supported by said frame member, said shaft being centered in the silo; a prime mover drivably connected to said rotatable vertical shaft; a radially disposed collecting arm mounted below said frame member and connected at its inner end to said vertical shaft; means operatively associated with said rotatable vertical shaft for revolving said collecting arm thereabout; an auger shaft having a helical blade thereon mounted beneath said collecting device, said auger shaft being drivably connected at its inner end to said vertical shaft and projecting radially outwardly therefrom; a member longitudinally slidably connected to the outer end of said auger shaft; and means depending from said frame member closely adjacent the silo wall secured to and supporting said longitudinally slidable member.

4. In combination with a silo having a plurality of removable, vertically aligned, bow-shaped doors, said doors forming a silage discharge chute on the interior of the silo wall, a silo unloader comprising: a frame member movably mounted adjacent the top surface of the silage, a portion of said frame member terminating adjacent the silo wall in diametrical alignment with said removable doors; a vertical shaft depending from and rotatably supported by said frame member, said shaft being centered in the silo; a prime mover drivably connected to said rotatable vertical shaft; rotatable collecting means mounted below said frame member and operatively associated with said vertical shaft; a lateral conveyor mounted beneath said collecting means, said lateral conveyor being drivably connected to said vertical shaft and projecting radially outwardly therefrom in diametrical alignment with said doors, the outer end of said conveyor terminating adjacent the silo wall; and a plate supported by and between the outer ends of said frame member and said lateral conveyor, a portion of said plate being positioned in horizontal alignment with said rotatable collecting means, said plate being as wide as said doors and being positioned to cover the same.

5. In combination with a silo having silage therein and having a vertical silage discharge chute in the interior of the silo adjacent the silo wall, a silo unloader comprising: a frame member movably mounted adjacent the top surface of the silage, said frame member having a rigid portion extending radially outwardly from the center of the silo to a point adjacent said discharge chute; a rigid vertical shaft rotatably supported by said frame member and centered in the silo; a prime mover drivably connected to said rotatable vertical shaft; silage collecting means operatively associated with said prime mover and positioned to engage and collect silage from the top surface of the silage; a lateral conveyor operatively associated with said prime mover and extending radially outwardly from said vertical shaft below and in alignment with said frame member radially-extending portion, said lateral conveyor being positioned to deposit silage collected from the top surface of the silage by said collecting means into said interior discharge chute; and brace means rigidly connecting said frame member radially-extending portion and said lateral conveyor at a point closely adjacent the silo wall.

6. In combination with a silo having silage therein and having a silage discharge chute extending along the silo wall, silo unloading apparatus comprising a vertical guide member extending along the silo wall adjacent said discharge chute, a frame mounted adjacent the top surface of the silage, said frame having a portion extending radially outward from the center of the silo to a point adjacent said discharge chute, a vertical shaft rotatably supported by the frame and disposed at the center of the silo, a prime mover drivably connected to said vertical shaft, silage collecting means operably associated with said prime mover and located beneath said frame and adapted to engage and collect silage from the top surface of the silage, a lateral conveyor operably associated with said prime mover and extending radially outward from said vertical shaft below and in alignment with the radially-extending portion of said frame, said lateral conveyor being positioned to deposit silage collected from the top surface of the silage by said collecting means into said discharge chute, a brace rigidly connecting the radially extending portion of the frame and the outer end of said conveyor, and means for movably mounting said brace on said guide member.

7. In combination with a silo having silage therein and having a silage discharge chute extending along the silo wall, silo unloading apparatus comprising a vertical guide member extending along the silo wall adjacent said discharge chute, a frame mounted adjacent the top surface of the silage, said frame having a portion extending radially outward from the center of the silo to a point adjacent said discharge chute, a vertical shaft rotatably supported by the frame and disposed at the center of the silo, a prime mover drivably connected to said vertical shaft, silage collecting means operably associated with said prime mover and located beneath said frame and adapted to engage and collect silage from the top surface of the silage, a lateral conveyor operably associated with said prime mover and extending radially outward from said vertical shaft below and in alignment with said frame, said lateral conveyor being positioned to deposit silage collected from the top surface of the silage by said collecting means into said discharge chute, a brace rigidly connected to the radially extending portion of the frame and the outer end of the conveyor and forming a vertically movable rigid frame assemblage projecting radially outward in a vertical plane from the center of the silo, said brace being slidably mounted on said guide member to enable said frame assemblage to move vertically within the silo, and wheel means secured to the outer end of said silage gathering means and adapted to ride over said brace as the silage gathering means rotates within the silo.

8. The structure specified in claim 1 further characterized by spinning means mounted on and for rotation with the lower end of said vertical shaft below said lateral conveyor.

References Cited in the file of this patent

UNITED STATES PATENTS

| | | |
|---|---|---|
| 1,275,558 | Holmgreen | Aug. 13, 1918 |
| 2,445,056 | Cordis | July 13, 1948 |
| 2,635,770 | Tiedmann | Apr. 21, 1953 |
| 2,794,560 | Buschbom | June 4, 1957 |
| 2,834,483 | Friedman | May 13, 1958 |
| 2,858,033 | Hofer | Oct. 28, 1958 |
| 2,912,127 | Blixrud | Nov. 10, 1959 |
| 2,963,327 | Symour et al. | Dec. 6, 1960 |